US00RE42399E

(19) United States
(12) Reissued Patent
Yang

(10) Patent Number: US RE42,399 E
(45) Date of Reissued Patent: May 24, 2011

(54) METHOD OF CONVERTING AUDIO DATA FOR A PORTABLE DEVICE AND REPRODUCING THE CONVERTED AUDIO DATA

(75) Inventor: Won Jun Yang, Gyeonggi-do (KR)

(73) Assignee: LG Electronics Inc., Seoul (KR)

(21) Appl. No.: 12/494,253

(22) Filed: Jun. 29, 2009

Related U.S. Patent Documents

Reissue of:
(64) Patent No.: 7,124,444
Issued: Oct. 17, 2006
Appl. No.: 10/127,596
Filed: Apr. 23, 2002

U.S. Applications:
(63) Continuation of application No. 12/252,691, filed on Oct. 16, 2008.

(30) Foreign Application Priority Data

Apr. 24, 2001 (KR) ..... 2001-21909

(51) Int. Cl.
*H03M 1/68* (2006.01)
*G11B 20/00* (2006.01)
*H04K 1/00* (2006.01)
*H04L 9/00* (2006.01)

(52) U.S. Cl. ..... 726/26; 700/94; 705/57; 726/30; 380/236; 380/237; 713/193

(58) Field of Classification Search ..... None
See application file for complete search history.

(56) References Cited

U.S. PATENT DOCUMENTS

| | | | | |
|---|---|---|---|---|
| 5,379,433 | A | 1/1995 | Yamagishi | |
| 5,745,583 | A | 4/1998 | Koizumi et al. | |
| 6,226,618 | B1 | 5/2001 | Downs et al. | |
| 6,253,193 | B1 * | 6/2001 | Ginter et al. | 705/57 |
| 6,983,371 | B1 | 1/2006 | Hurtado et al. | |
| 7,130,426 | B1 | 10/2006 | Cha et al. | |
| 2001/0053979 | A1 | 12/2001 | Kori | |
| 2004/0237750 | A1 | 12/2004 | Smith et al. | |

FOREIGN PATENT DOCUMENTS

| | | | |
|---|---|---|---|
| CN | 1267856 | | 9/2000 |
| DE | 1005252 | A2 * | 5/2000 |
| DE | 19854125 | A1 | 5/2000 |
| JP | 02-287970 | | 11/1990 |
| JP | 07-331659 | | 12/1995 |
| JP | 09171664 | | 6/1997 |
| JP | 10-108148 | | 4/1998 |
| JP | 11-328849 | | 11/1999 |
| JP | 200-235772 | | 8/2000 |
| JP | 2001-005497 | * | 1/2001 |
| JP | 2001-067100 | * | 3/2001 |
| KR | 1998-0025007 | | 7/1998 |

OTHER PUBLICATIONS

English translation of Kazuhisa JP2001–067100, which was entered into the record on Jan. 8, 2010. Kazuhisa has a publication date of Mar. 16, 2001.*

(Continued)

*Primary Examiner*—Jung Kim
(74) *Attorney, Agent, or Firm*—Birch Stewart Kolasch & Birch, LLP

(57) ABSTRACT

A method of converting audio data encrypted for anti-piracy and copyright protection to a suitable format so that the data can be played in a portable device. A computer first decrypts the encrypted audio data and inserts information for setting equalizer, then encrypts the audio data lightly with the information for setting equalizer and transmits the data to a portable device. The portable device sets equalizer suitable to the lightly-encrypted audio data using the information for setting equalizer inserted by the computer, then decrypts the lightly-encrypted audio data, and outputs the decrypted audio data while amplifying or attenuating audio data for each band according to the set equalizer. Therefore, heavily encrypted audio data can be playable in a portable device with relatively low computing power and, by setting equalizer mode suitable to a music genre, the audio data can be conveyed to a listener authentically.

16 Claims, 3 Drawing Sheets

OTHER PUBLICATIONS

English translation of Masaru JP2001–005497, which was entered into the record on Jan. 8, 2010. Masaru has publication date of Jan. 12, 2001.*

English translation of Rychlak DE19854125, which corresponds to EP1005252 which was entered into the record on Jan. 8, 2010. Rychlak has a publication date of May 31, 2000.* machine language translation of the Korean allowance opinion for copending Korean application 2001–0021909; the Korean opinion is dated May 28, 2007.* machine language translation of the Korean allowance sheet for copending Korean application 2001–0021909; the Korean allowance sheet is dated May 28, 2007.* machine language translation of the Japanese patent application publication No. 2000–235772; publication dated: Aug. 29, 2000.*

English machine translation of JP–2001–5497–A published on Jan. 12, 2001.

English machine translation of JP–2001–67100–A published on Mar. 16, 2001.

Partial English translation of DE–19854125–A1, published on May 25, 2000.

U.S. Office Action issued in U.S. Appl. No. 12/252,691 dated Oct. 12, 2010.

* cited by examiner

*EA : Equalizer Available*
*Genre : Music Genre*
*PON : Paid Or Not*
*NP : Number Permitted*

METHOD OF CONVERTING AUDIO DATA FOR A PORTABLE DEVICE AND REPRODUCING THE CONVERTED AUDIO DATA

Matter enclosed in heavy brackets [ ] appears in the original patent but forms no part of this reissue specification; matter printed in italics indicates the additions made by reissue.

*This application is a Continuation Reissue Application of co-pending U.S. Reissue application Ser. No. 12/252,691 filed on Oct. 16, 2008, which is a Reissue of U.S. Pat. No. 7,124,444B2 (application Ser. No. 10/127,596 filed Apr. 23, 2002), which claims foreign priority benefits of Korean Patent Application No. 2001-21909 filed Apr. 24, 2001 in Republic of Korea. The entire contents of each of the above-identified applicants are hereby incorporated by reference. Notice: More than one reissue application has been filed for the reissue of U.S. Pat. No. 7,124,444. The reissue applications are application Ser. No. 12/252,691, application Ser. No. 12/494,250, application Ser. No. 12/494,253, and application Ser. No. 12/494,255.*

BACKGROUND OF THE INVENTION

1. Field of the Invention

The present invention relates to a method of converting audio data encrypted for anti-piracy and copyright protection to a suitable format to be played in a portable device, such as an MP3 player, and reproducing the converted audio data.

2. Background of the Related Art

Newly developed portable audio devices, such as an MP3 player, are very popular. An MP3 player is able to decode MP3-formatted digital audio file stored in a flash memory to produce high-quality sounds. Further, most MP3 players have interfacing function of communicating with a personal computer (PC). Accordingly, after a user obtains MP3 audio files from Web sites, with or without a fee, through Web surfing and downloading processes, the user stores the obtained MP3 files from a PC in an internal memory of an MP3 player through the interfacing function.

The digital audio data that are usually conveyed through a network, such as the Internet, are heavily encrypted through Digital Right Management (DRM) system to protect copyright.

Generally, decrypting such heavily-encrypted audio data requires a high computing power, and only after decryption, the data can be played by a device of much lower computing power than a conventional PC. The data can not be played by a portable device because a portable device, of which computing power is relatively low, can not conduct decrypting and decoding operation simultaneously in real time.

Accordingly, for listening to such heavily-encrypted audio data with a portable device, the following sequential steps should be performed: decryption of heavily-encrypted audio data with a PC; light or no re-encryption of the decrypted audio data; and transmission of the lightly-encrypted or non-encrypted audio data to a portable device.

Furthermore, the portable audio device has an equalizing function in general to improve fidelity of music listening. However, in the portable audio device with equalizing function, an equalizing mode suitable to a certain music genre is not set automatically. A user must select one of several equalizing modes believed proper for the present music to be played or adjust manually an individual amplifying gain for each band.

Needless to say, such selection and adjustment for each music is very tedious, and most users do not use equalizing function embodied in the portable audio device. As a result, music does not get conveyed to a listener authentically.

SUMMARY OF THE INVENTION

An object of the invention is to solve at least the above problems and/or disadvantages and to provide at least the advantages described hereinafter.

Another object of the present invention to provide a method of providing equalizing information for a portable device along with format-converted audio data after converting the audio data encrypted for anti-piracy and copyright protection to a suitable format for being played in the portable device.

Another object of the present invention to provide a method of playing the format-converted audio data using the equalizing information inserted therein.

In order to achieve at least the above objects in whole or in part, and in accordance with the purpose of the present invention, as embodied and broadly described, there is provided a method for converting encrypted audio data, including decrypting the encrypted audio data, inserting information for setting equalizer in the decrypted audio data, and re-encrypting the decrypted audio data with the information for setting the equalizer.

To further achieve at least the above objects in whole or in part, and in accordance with the purpose of the present invention, as embodied and broadly described, there is provided a method for playing encrypted audio data, including reading play control information contained in the encrypted audio data, determining whether to play the encrypted audio data based on the read play control information, decrypting the encrypted audio data if determined to play, and outputting the decrypted audio data while conducting equalizer function for the decrypted audio data based on the read play control information.

According to a method of converting encrypted audio data to a suitable format for a portable device and playing the converted audio data of the present invention, a computer decrypts the encrypted audio data, inserts information for setting equalizer in the decrypted audio data, re-encrypts lightly the decrypted audio data with the information for setting equalizer, and transmits the lightly-encrypted audio data to a portable device. The portable device then sets equalizer suitable to the lightly-encrypted audio data using the information for setting equalizer inserted by the computer. The portable device further decrypts the lightly-encrypted audio data, and outputs the decrypted audio data while amplifying or attenuating audio data for each band according to the set equalizer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF PREFERRED EMBODIMENTS

Figure 1:
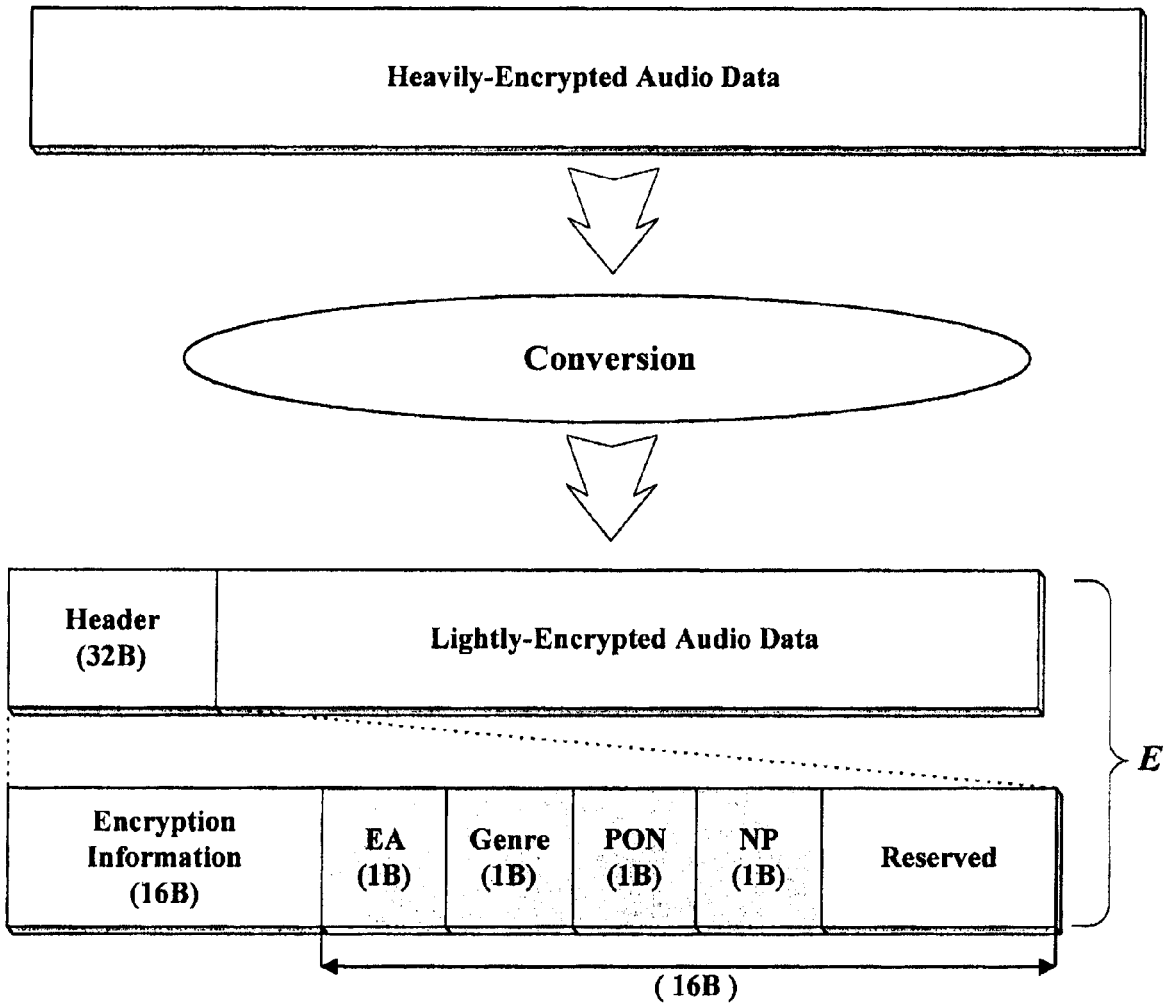
FIG. 1 shows a schematic conversion process in which encrypted audio data are converted to a suitable format for being played in a portable device.

In order that the invention may be fully understood, preferred embodiments of the present invention will now be described with reference to the accompanying drawings. FIG. 1 shows a schematic conversion process according to preferred embodiments of the present invention in which encrypted audio data are converted to a suitable format for being played in a portable device.

As shown in FIG. 1, heavily-encrypted audio data 2 goes through a conversion 4. In the format E of FIG. 1, a piece of music is composed of encrypted data and header, the encrypted data has been encrypted much more lightly than the original encryption. The light encryption is preferably sufficient to ensure stable and sufficient decryption with relatively low computing power.

The 32-byte header preferably includes the following fields: 16-byte 'Encryption Information' necessary to decrypt lightly-encrypted audio data; 1-byte 'Equalizer Available' indicating whether or not the information about an equalizer mode suitable to music genre of audio data is included; 1-byte 'Music Genre'; and 1-byte 'Paid Or Not' indicating if the audio data has been released for free or it is purchased. A 1-byte 'Number Permitted' field preferably indicates the number of playbacks permitted when the 'Paid Or Not' byte indicates trial release, and a 12-byte field is 'Reserved'.

When the 'Equalizer Available' is set to '1', information indicative of music genre of the audio data or equalizer adjusting parameters is preferably written in the 'Music Genre'. The equalizer adjusting parameters are about signal amplifying or attenuating rate for each band. If the 'Paid Or Not' is set to 'Trial Release', the permissible number of playbacks without purchase is preferably written in the 'Number Permitted'. Otherwise, no information need to be written in the 'Number Permitted'. The 32-byte header may be encrypted, if needed, with an encryption key known to a portable device that will receive the audio data formatted as shown in FIG. 1.

Figure 2:
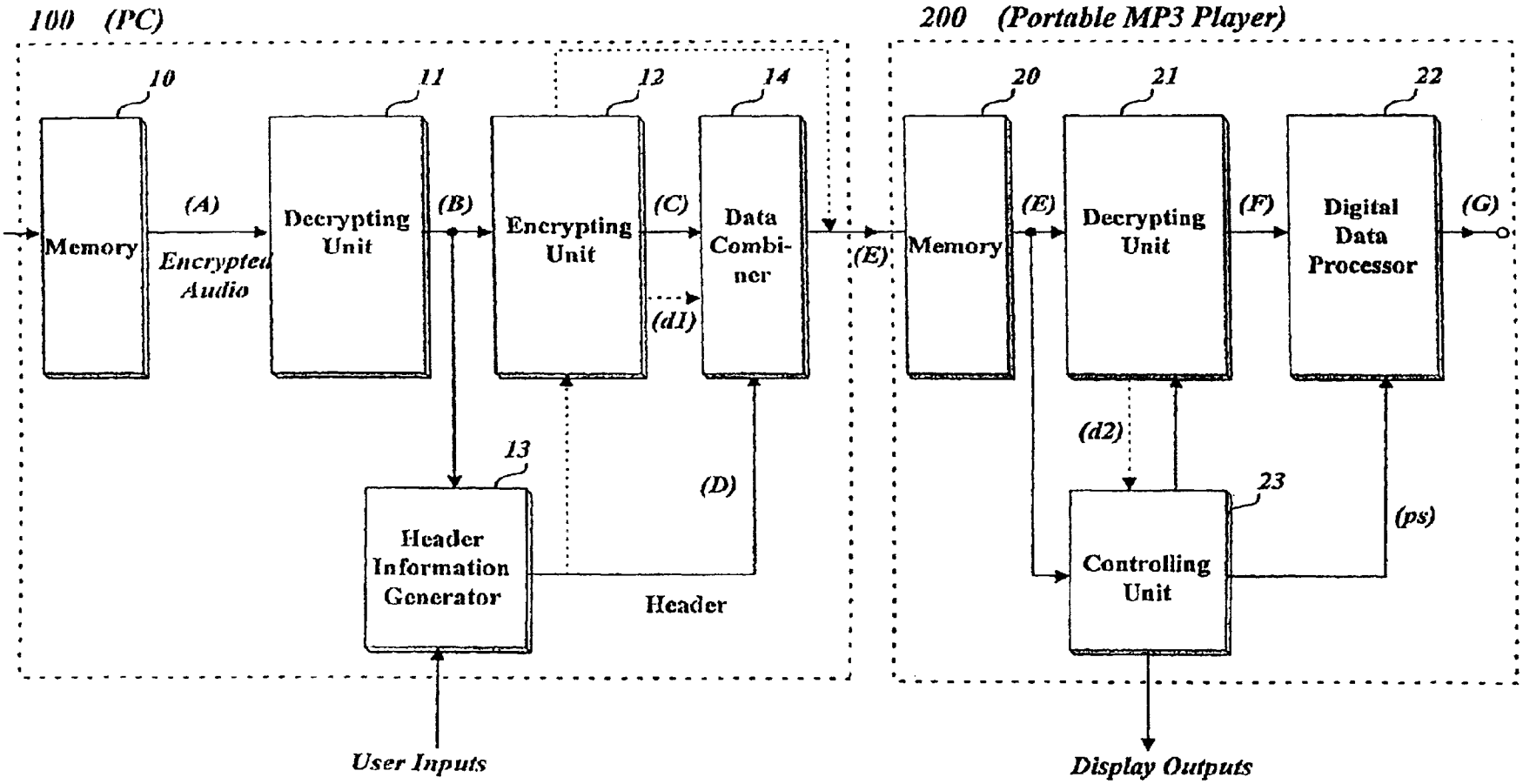
FIG. 2 is a block diagram showing a preferred embodiment of a portable device and a PC that conducts the conversion process depicted in FIG. 1.
Figure 3:
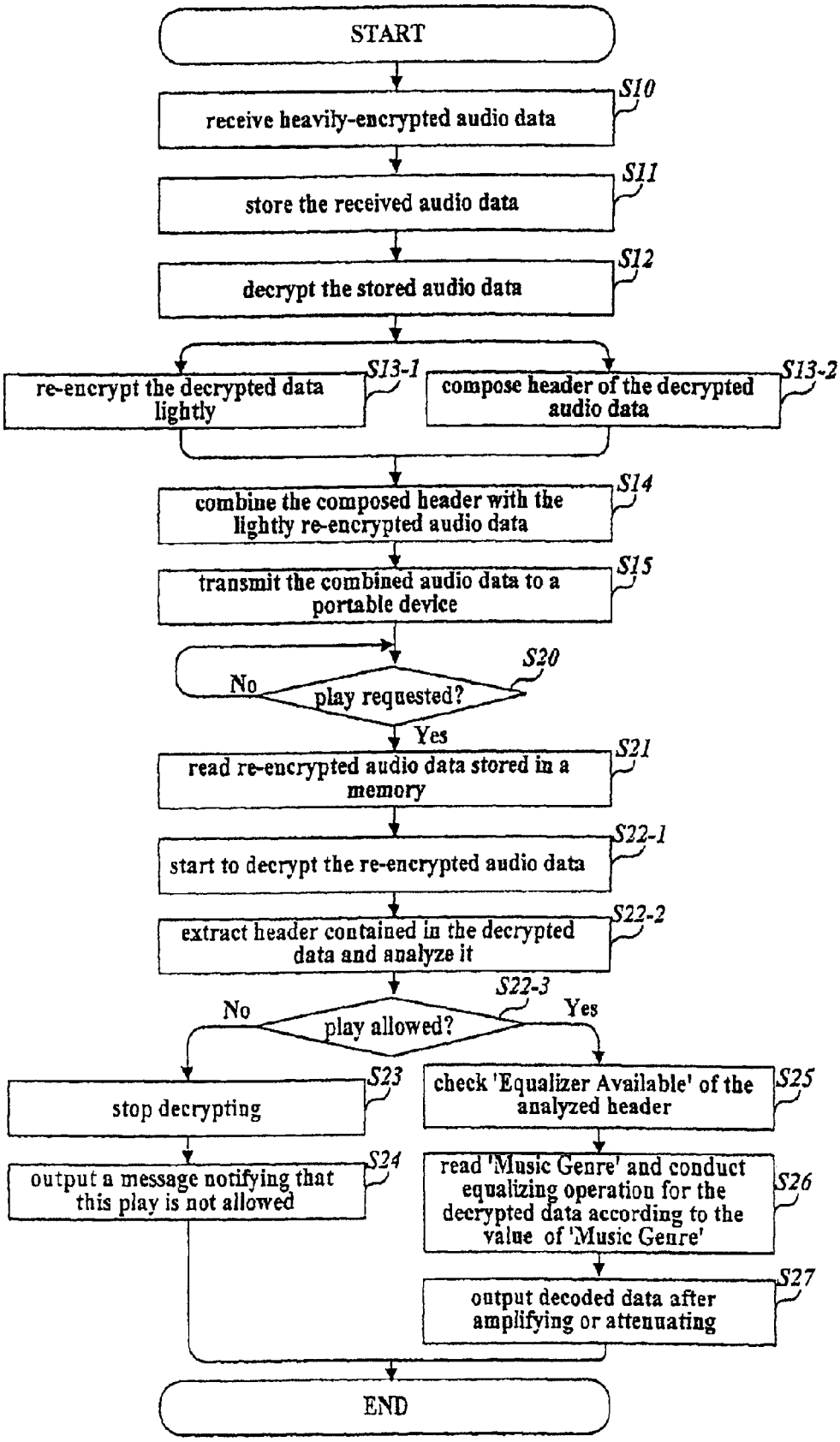
FIG. 3 is a flow chart showing a preferred embodiment of a converting process according to the present invention.

FIG. 2 is a simplified block diagram showing a preferred embodiment of a portable device and a PC, which can conduct the conversion process depicted in FIG. 1, connected with the portable device. FIG. 3 is a flow chart showing a preferred embodiment of a conversion process according to the present invention, which can be conducted by the PC and the portable device as shown in FIG. 2. The preferred embodiment of a conversion process shown in FIG. 3 will be described using elements shown in FIG. 2, however, the present invention is not intended to be so limited.

After initiating, first a PC 100 receives encrypted audio data (Step S10) preferably from a server located in a network through its network adapter (not shown) connectable to the network or the like. The PC 100 stores received data in an internal memory 10 temporarily (Step S11). Then, a decrypting unit 11 decrypts the encrypted audio data A stored in the memory 10 (Step S12) with a known decryption key and outputs decrypted audio data B to an encrypting unit 12. The encrypting unit 12 re-encrypts the decrypted audio data B (Step S13-1) to output re-encrypted audio file C. The re-encryption is conducted much more lightly than the original encryption of the audio data A. For example, the encrypting unit 12 uses an encryption key whose bit length is much shorter than that of original encryption key. The re-encryption is preferably sufficiently performed in a device 200 to provide satisfactory real-time performance.

In the meantime, a header information generator 13 of the PC preferably analyzes information following "TAG" string identifier appended to the decrypted audio data. The appended information may include music genre, DRM-related information, etc. in the form of text. Therefore, the header information generator 13 extracts necessary information from the appended information to transcribe or fill in respective associated fields of the header depicted in FIG. 1 (Step S13-2).

For example, if there is Dynamic Range Management (DRM) related information, the 'Paid Or Not' and the 'Number Permitted' are filled in with the information respectively, and if there is music genre information the 'Music Genre' is filled in with the music genre information or equalizer adjusting parameters pre-assigned to that genre. In this case, since the 'Music Genre' is valid, the 'Equalizer Available' is set. If there is no information related with music genre and DRM in the appended information, the fields of the header may be filled with information (e.g., per genre or per equalizer band) entered by a user.

The header information generator 13 preferably sends the 32-byte header D with 16-byte blanks reserved for 'Encryption Information' to a data combiner 14, which places the received header D before the lightly-encrypted audio data received from the encrypting unit 12 (Step S14). The data combiner 14 also writes in the 16-byte blanks of the header D an encryption key d1 used in the light re-encryption of the encrypting unit 12 after receiving it from the encrypting unit 12. Through this data combination, final re-encrypted audio data E which will be provided for the portable device are made. If the header is to be encrypted, the header information generator 13 can transmit the 32-byte header with 16-byte blanks to the encrypting unit 12 to be encrypted therein along with the audio data.

The lightly-encrypted audio data E with the header are then transmitted to the portable player 200, e.g., MP3 player in wired or wireless connection to the PC 100 (Step S15).

The transmitted lightly-encrypted audio data E are stored in a memory 20 of the MP3 player 200. If the stored audio data are selected to be played by a user (Step S20), they are retrieved (Step S21) by a controlling unit 23 and are sent to a decrypting unit 21 which decrypts the received encrypted audio data (Step S22-1) with the information written in 'Encryption Information' of the received header to produce non-encrypted audio data F. If the 32-byte header has been encrypted too, the decrypting unit 21 decrypts the header first and sends the decrypted header information d2 to the controlling unit 23.

Because the received audio data F have been encrypted much lightly, their real-time decryption is ensured in the decrypting unit 21 with low computing power.

In the meantime, the controlling unit 23 also receives the header included in the retrieved audio data from the memory 20 and analyzes it (Step S22-2). If the header has been encrypted, the controlling unit 23 receives decrypted header information d2 from the decrypting unit 21. The header analysis preferably includes a play allowed determination. If the header analysis is indicative of non-allowable playback (Step S22-3), e.g., if the 'Paid Or Not' tells 'Trial Release' and the 'Number Permitted' is zero, the controlling unit 23 stops the decrypting of the decrypting unit 21 immediately (Step S23) and outputs a message notifying that this playback is not allowed to a displaying unit such as an Liquid Crystal Display (LCD) (Step S24). If the 'Number Permitted' is not zero, the controlling unit 23 will decrement value written in the 'Number Permitted' by one and update the header of the audio data stored in the memory 20 preferably after decrypted audio data are completely outputted.

If the header analysis is indicative of allowable playback (Step S22-3), the controlling unit 23 continues the decrypting. Thus, if the 'Paid Or Not' is indicative of rightful purchase, the controlling unit 23 makes the decryption of the decrypting unit 21 proceed continuously regardless of the 'Number Permitted'. In these cases that the decryption must proceed without termination, the controlling unit 23 checks the 'Equalizer Available' of the received header (Step S25) and reads value written in the 'Music Genre' if the 'Equalizer Available' is set. Then, the controlling unit 23 conducts equalizing operation for the decrypted audio data according to the read value (Step S26).

If the value in the 'Music Genre' is actually indicative of music genre, the controlling unit 23 reads equalizer adjusting parameters ps pre-assigned to the value from an internal memory and sets the parameters ps to a digital signal processor 22. If the value in the 'Music Genre' is about equalizer adjusting parameters, then the controlling unit 23 sets the read value (e.g., the read equalizer adjusting parameters) to the digital signal processor 22.

The digital signal processor 22 decodes the decrypted audio data F from the decrypting unit 21 while amplifying or attenuating the decoded data for each band according to each band gain set by the equalizer adjusting parametersps from the controlling unit 23. Bach of the decoded data G magnitude is amplified or attenuated are converted to real sound by an output device (not shown) next to the digital data (signal) processor 22 (Step S27). Through the self-adjusting or automatic equalizing function, the music is conveyed as desired to a listener.

The above described preferred embodiments including decryption of the lightly-encrypted audio data and automatic equalizer setting function for a music genre were described using an MP3 player. However, the present invention was not intended to be so limited. For example, the preferred embodiments can be adapted to a PDA (Personal Digital Assistant) capable of processing digital data.

As described above, preferred embodiments according to the present invention have various advantages. The preferred embodiments of a method of converting encrypted audio data to a suitable format for a portable device and of reproducing the converted audio data makes audio data encrypted heavily for anti-piracy and copyright protection playable in a portable device of which computing power is relatively low. Further, the preferred embodiments can convey the audio data to a listener properly, authentically or as selected well by setting equalizer mode suitable to the music genre of the audio data.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

[1. A method for converting encrypted audio data, comprising:

decrypting the encrypted audio data;

inserting information for setting an equalizer function in the decrypted audio data; and re-encrypting the decrypted audio data with the information for setting the equalizer function.]

[2. The method of claim 1, wherein the information insertion uses lighter encryption than an original encryption which was used for the encrypted audio data.]

[3. The method of claim 1, wherein said information for setting the equalizer function is indicative of music genre.]

[4. The method of claim 1, wherein said information for setting the equalizer function is equalizer adjusting parameters specifying signal amplifying or attenuating rate for each band.]

[5. The method of claim 1, further comprising transmitting the re-encrypted audio data to an audio device, wherein said information for setting the equalizer function is equalizer adjusting parameters specifying signal amplifying or attenuating rate for a plurality of bands.]

[6. The method of claim 5, wherein said audio device is a portable device.]

[7. The method of claim 1, further comprising inserting information required for protecting copyright of the encrypted audio data.]

[8. The method of claim 7, wherein said information required for protecting copyright includes information indicative of whether the encrypted audio data are purchased.]

[9. The method of claim 7, wherein said information required for protecting copyright includes information indicative of a number of allowable playbacks of the encrypted audio data.]

[10. The method of claim 1, further comprising inserting encryption information required for decrypting the re-encryptyg audio data into the re-encrypted audio data.]

[11. The method of claim 1, wherein said information for setting the equalizer function is also encrypted along with the decrypted audio data.]

[12. The method of claim 1, further comprising inserting information, including music genre and dynamic range management related information, into a header file.]

[13. The method of claim 12, further comprising receiving and storing information entered by a user in the header file.]

[14. The method of claim 12, further comprising writing an encryption key used with the re-encrypted audio data into the header file.]

[15. A method for playing encrypted audio data, comprising:

reading play control information contained in the encrypted audio data;

determining whether to play the encrypted audio data based on the read play control information;

decrypting the encrypted audio data if determined to play; and outputting the decrypted audio data while conducting an equalizer function for the decrypted audio data based on the read play control information.]

[16. The method of claim 15, wherein said play control information includes information for setting the equalizer function for the encrypted audio data and information required for protecting copyright of the encrypted audio data.]

[17. The method of claim 16, wherein said information for setting the equalizer function is indicative of music genre, and wherein said information required for protecting copyright is information indicative of how many times the encrypted audio data can be played.]

[18. The method of claim 15, further comprising decrypting a header containing the play control information if the header is encrypted along with the audio data.]

[19. The method of claim 15, further comprising playing the audio data and decrementing a value of a permitted play number, if the value of the permitted play number is not zero.]

[20. The method of claim 15, further comprising determining the encrypted audio data, wherein the determining the encrypted audio data comprises:

first decrypting a digital right management system encryption of data; and performing a first encryption of said first decrypted data that results in the encrypted audio data, wherein the first encryption has reduced computational requirements for said decrypting the encrypted audio data relative to the first decryption of the digital right management system encryption.]

*21. A device for playing encrypted audio data, comprising:*

*a receiving unit configured to receive an audio data file from an external device, the audio data file including encrypted audio data, genre information and management information associated with the encrypted audio data, the management information including equalizer preset information, play control information and encryption information, wherein the equalizer preset information is separated from the genre information, and the equalizer preset information is set at the external device, and wherein the equalizer preset information includes an equalizer parameter specifying a signal amplifying or attenuating rate for a band of the audio data; and*

*a controller configured to:*

*read the play control information and determine whether to play the audio data based on the play control information,*

*decrypt the audio data by using the encryption information and based on a result of the determination, and*

*output the decrypted audio data that is equalized while conducting an equalizing function for the decrypted audio data based on the play control information and the equalizer preset information.*

*22. The device of claim 21, wherein the management information is included in a header of the audio data.*

*23. The device of claim 21, wherein the play control information indicates whether or not the encrypted audio data is authorized to be played.*

*24. The device of claim 21, wherein the controller decrypts the encrypted audio data when the play control information indicates that the encrypted audio data is authorized to be played.*

*25. The device of claim 21, wherein the play control information includes permission information and/or restriction information for a playback of the audio data.*

*26. The device of claim 21, wherein the equalizer preset information is configured for being set at the external device by a user.*

*27. The device of claim 21, wherein the external device includes a personal computer.*

*28. The device of claim 21, wherein the genre information is metadata information.*

*29. A method for playing encrypted audio data, the method being performed by a playing device and comprising:*

*receiving an audio data file from an external device, the audio data file including encrypted audio data, genre information and management information associated with the encrypted audio data, the management information including equalizer preset information, play control information and encryption information, wherein the equalizer preset information is separated from the genre information, and the equalizer preset information is set at the external device, and wherein the equalizer preset information includes an equalizer parameter specifying a signal amplifying or attenuating rate for a band of the audio data;*

*reading the play control information and determining whether to play the audio data based on the play control information;*

*decrypting the audio data by using the encryption information and based on a result of the determining step; and*

*outputting the decrypted audio data that is equalized while conducting an equalizing function for the decrypted audio data based on the play control information and the equalizer preset information.*

*30. The method of claim 29, wherein the management information is included in a header of the audio data.*

*31. The method of claim 29, wherein the play control information indicates whether or not the encrypted audio data is authorized to be played.*

*32. The method of claim 29, wherein the decrypting step decrypts the encrypted audio data when the play control information indicates that the encrypted audio data is authorized to be played.*

*33. The method of claim 29, wherein the play control information includes permission information and/or restriction information for a playback of the audio data.*

*34. The method of claim 29, wherein the equalizer preset information is configured for being set at the external device by a user.*

*35. The method of claim 29, wherein the external device includes a personal computer.*

*36. The method of claim 29, wherein the genre information is metadata information.*

* * * * *